United States Patent [19]

Kain

[11] Patent Number: 5,478,135
[45] Date of Patent: Dec. 26, 1995

[54] CHILD CARRIER WITH DETACHABLE BASE

[75] Inventor: James M. Kain, Tipps City, Ohio

[73] Assignee: Lisco, Inc., Tampa, Fla.

[21] Appl. No.: 330,452

[22] Filed: Oct. 28, 1994

Related U.S. Application Data

[63] Continuation-in-part of Ser. No. 130,341, Oct. 1, 1993, Pat. No. 5,385,387.

[51] Int. Cl.$^6$ .................................................. B60N 2/28
[52] U.S. Cl. .................. 297/256.16; 297/256.17; 297/184.13
[58] Field of Search ............... 297/250.1, 256.16, 297/156.17, 184.13

[56] References Cited

U.S. PATENT DOCUMENTS

| | | | |
|---|---|---|---|
| 4,345,791 | 8/1982 | Bryans et al. | 297/250 |
| 4,634,177 | 1/1987 | Meeker | 297/250 |
| 4,861,105 | 8/1989 | Merten et al. | 297/250 |
| 4,911,499 | 3/1990 | Meeker | 297/260 |
| 4,943,113 | 7/1990 | Meeker | 297/250 |
| 4,958,887 | 9/1990 | Meeker | 297/250 |
| 5,056,865 | 10/1991 | Sedlack | 297/250 |
| 5,277,472 | 1/1994 | Freese et al. | 297/130 |

FOREIGN PATENT DOCUMENTS

| | | | |
|---|---|---|---|
| 1519793 | 8/1978 | United Kingdom | 297/250.1 |

*Primary Examiner*—Milton Nelson, Jr.
*Attorney, Agent, or Firm*—Donald R. Bahr; John E. Benoit

[57] ABSTRACT

A child carrier having a seat which may be attached and removed from a base. The base has a spring-loaded locking mechanism which automatically secures the seat in the base. The seat has a spring-loaded release trigger extending from its head end. The trigger is integral with an elongated member which engages a connection to the locking mechanism in the base so as to release the seat from the base. The base and seat comprise an infant car seat.

2 Claims, 8 Drawing Sheets

CHILD CARRIER WITH DETACHABLE BASE

This application is a continuation-in-part of U.S. patent application Ser. No. 08/130,341 filed Oct. 1, 1993, now U.S. Pat. No. 5,385,387.

The present invention is directed broadly to a child carrier and more specifically to an infant carrier which may be detachably mated with a base or may be used separately as a child support.

BACKGROUND OF THE INVENTION

Child carriers are in wide use, particularly relating to use in a car or the like. All of the states now require that some type of child seat be used in automobiles for use with children who are of a size whereby they cannot be protected by the standard seat belt arrangement of the automobile.

Seats have been proposed which have multiple uses, and particularly which may be used with a base or used separately without the base.

Seat base combinations are disclosed in U.S. Pat. No. 4,634,177 to Meeker and U. S. Pat. No. 4,729,600 to Single. Such systems are comprised of seats and bases separable from each other. Each base is designed to mate with the associated seat. Additionally, the seat portion has independent utility. In Meeker, the side edges of the infant seat are coupled at two space points to the lateral edges of the base. Uncoupling is effected through the location of a handle located in front of the child. In Single, the infant seat has lower rails on the sides for receipt in parallel recesses of the base. Uncoupling is effected in the center front of the seat through a buckle depending from a belt.

U.S. Pat. No. 4,943,113 to Meeker discloses a restraining system using a seat and a base with the seat being secured to the base at its foot end by means of a J-shaped hook molded to the foot end of the base. The head end of the base is also provided with a releasable coupling mechanism for securing the carrier thereto.

All of the above devices are usable primarily as a car seat, either together or separately, although they could be used as a simple seat when the seat and the base are attached.

SUMMARY OF THE INVENTION

The present invention discloses a child carrier which includes a seat and a base which mates with the underside of the seat. The base includes a spring-biased locking means which engages at the bottom of the seat. The seat itself includes a spring-biased latching means which, when the seat is engaged with the base, may be operated so as to release the locking means which secures the base to the seat. When the seat is removed from the base it is configured so that it may rest on the inside basket of a shopping cart with the spring-biased latching means engaging the forward transverse upper rod of the inner basket and with the foot end of the seat resting on the upper rear transverse rod of the shopping cart.

Thus, the invention provides means, particularly for infants, wherein the seat and base may be secured to a car seat by the car seat safety belt system and may be easily released from the base so that the infant may be carried in the seat and be conveniently secured within the inner basket of the shopping cart. Further, the seat may be used as an infant car seat and also as a stand-alone carrier.

DETAILED DESCRIPTION OF THE PREFERRED EMBODIMENT

Figure 1:
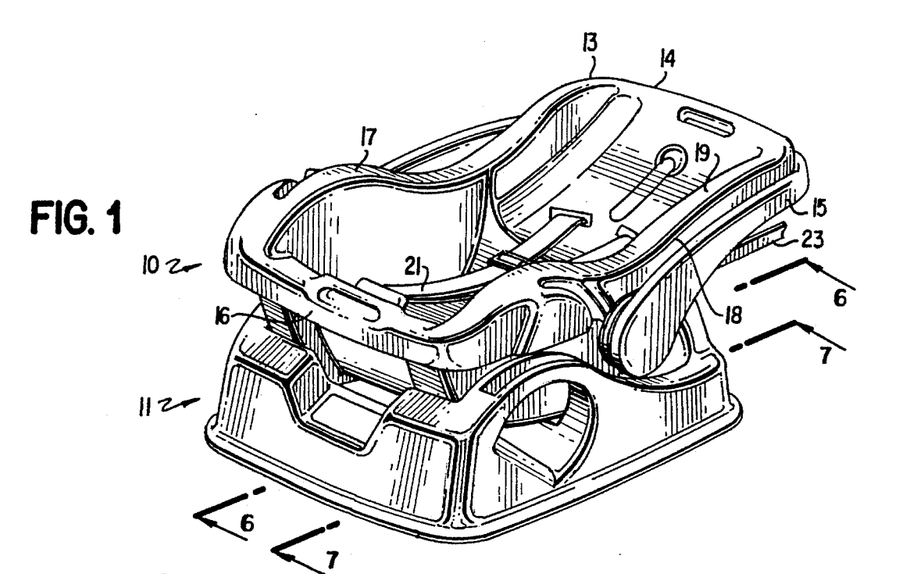
FIG. 1 is a perspective view of the carrier of the present invention with the seat mounted on the base.

Referring to FIG. 1, there is shown the carrier of the present invention including seat 10 and base 11. The seat is a molded shell 13 having head end 14 and foot end 16 with sides 18 and 17 extending between the ends. Shell 13 includes a harness for retaining the child within the seat. Handle 15 is rotatably attached to the sides of shell 13, as is canopy support 23.

Figure 2:
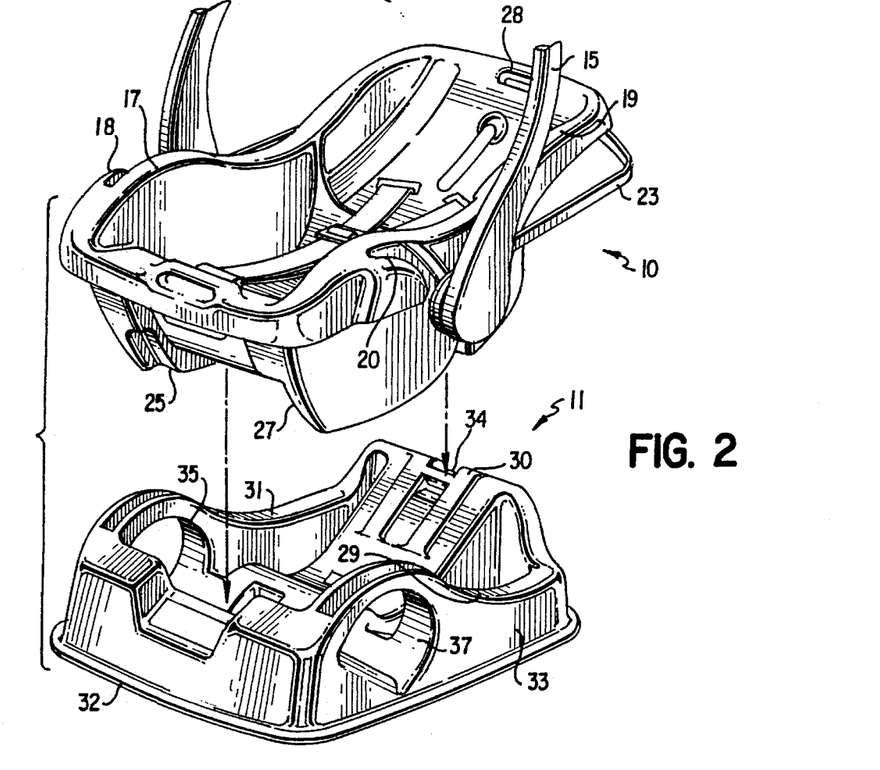
FIG. 2 is an exploded view showing the seat removed from the base.

FIG. 2 is an exploded view showing the seat removed from the base and includes leg structures 25 and 27 which are used to support the seat when used separately. Hooks 18 and 20 accommodate an automobile seat belt when the seat is used without the base.

Base 11 is preferably of a molded unitary structure and includes an arcuate inner surface 29, head end 30, and foot end 32 interconnected by side walls 31 and 33. The side walls include openings 35 and 37. Slot 28 passes through head end 30 and inverted U-shaped member 34 is integral with the base.

Figure 3:
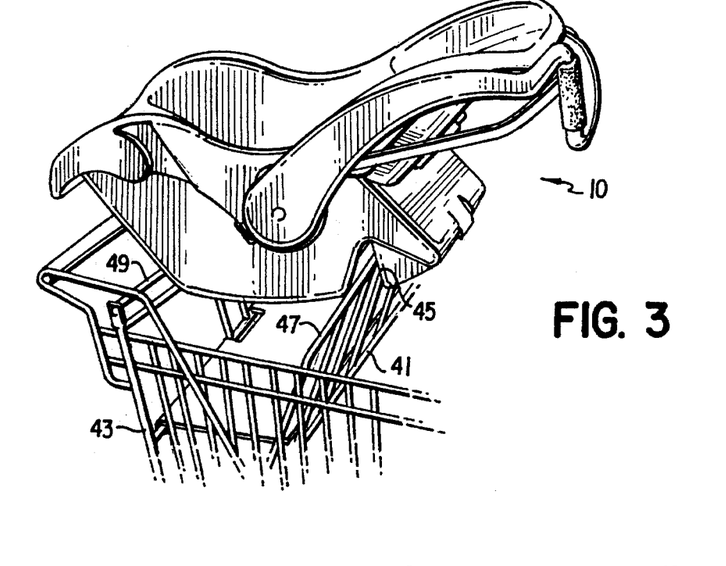
FIG. 3 is a perspective view showing the seat mounted on the inner basket of a shopping cart.

FIG. 3 is a perspective view showing seat 10 mounted on shopping cart 43. Most of the shopping carts in use today include a foldable inner basket 41 at the rear of the basket. As illustrated, a channel 45 which extends transversely through the bottom of the seat, rests on forward transverse bar 47 of the inner basket and is secured thereto by means which will be discussed as the description proceeds. The back end of the seat rests on rearward transverse bar 49 of the shopping cart.

Figure 4:
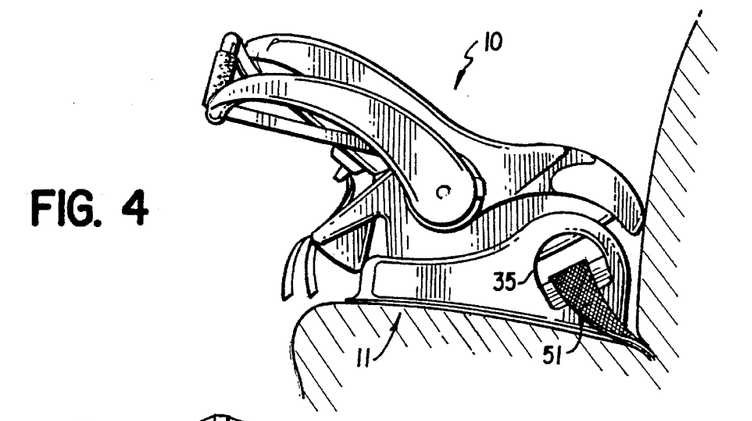
FIG. 4 is a side view showing the seat and base secured to the seat of an automobile.

FIG. 4 shows seat 10 mounted in base 11 with the base being secured by car seat belt 51 through openings 35 and 37. This is an infant configuration wherein the seat faces rearwardly.

Figure 5:
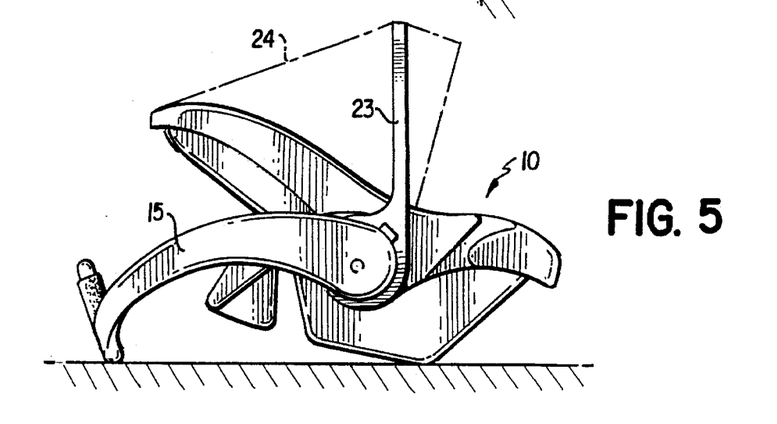
FIG. 5 is a side view showing the seat without the base.

FIG. 5 discloses the seat in use on a flat surface with handle 15 being rotated and locked so as to provide rear support. Also illustrated is canopy support member 23 being secured in an upward position with the canopy being shown in phantom lines.

The following description makes reference to FIGS. 6-17 for better understanding of the mechanism involved in the present invention.

Figure 6:
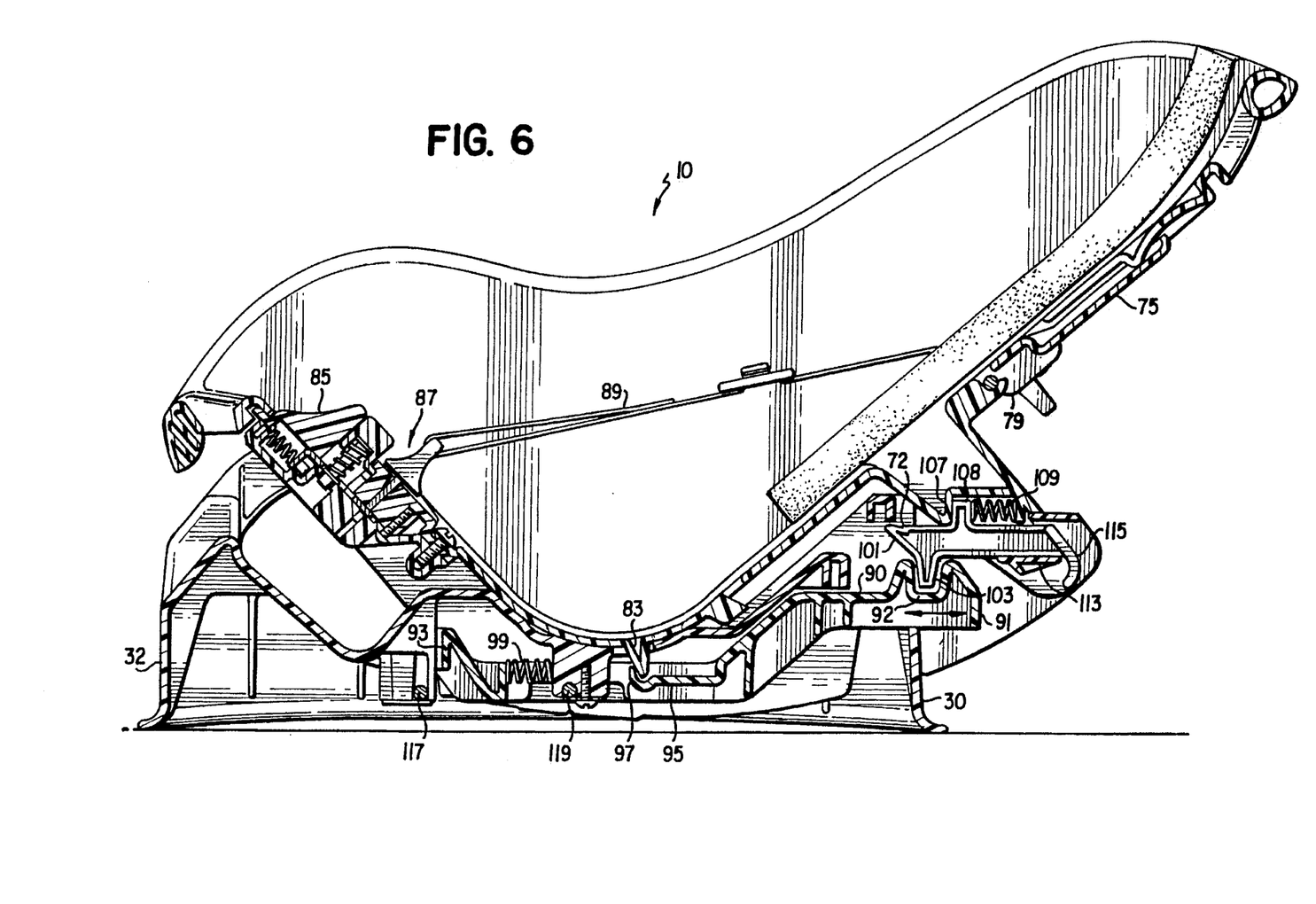
FIG. 6 is a sectional view taken through lines 6—6 of FIG. 1.

FIG. 6 is a sectional view taken through lines 6—6 of FIG. 1, which is essentially a centerline through the seat and base. Base 11, as discussed above, includes head end 30 and foot end 32 and is configured so as to mate with the bottom of seat 10. Upper section 75 of head end 30 includes aperture 77 through which belt 89 can pass so as to mate with strap retainer 79. Buckle 87 is shown with the tongue secured.

Figure 8:
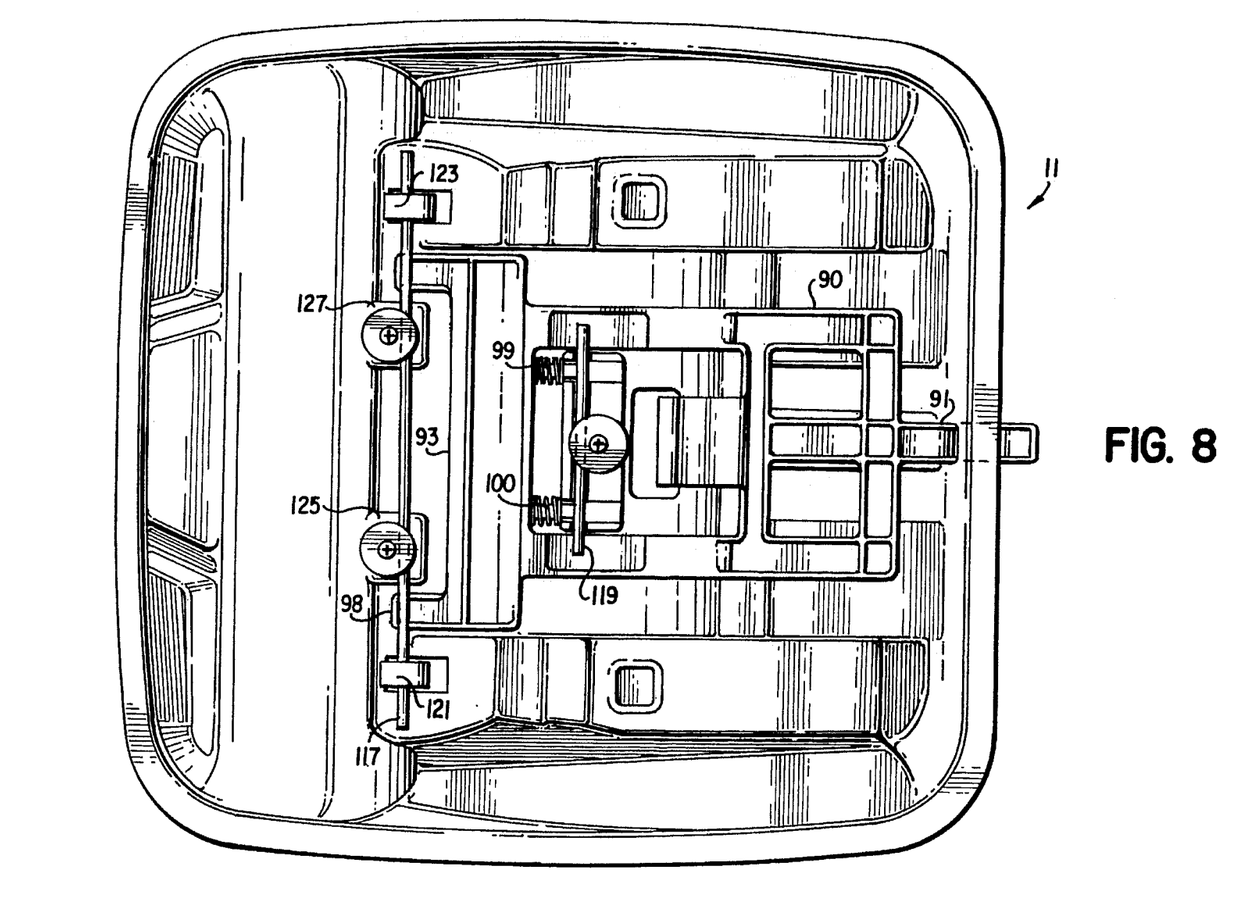
FIG. 8 is a bottom view of the base of FIG. 1.

Frame 90, which can be more clearly seen in FIG. 8, extends between the head end and foot end of the base. Finger 91 extends from one end and fingers 98 extend from the other end, again more clearly seen in FIG. 8. Semi-rigid flat finger 95 terminates in arcuate end 97, which mates with downwardly extending flange 83 on the bottom of seat 10 when the seat is in place on the base.

Springs 99 and 100, FIG. 8, bias frame 90 in a direction towards foot end 32. Elongated body 101 is retained within seat 10 at the head end thereof; it includes depending finger 103, which extends into channel 92 of frame 90. Upwardly extending finger 108 is biased against the inner surface of section 107 of seat 10 by means of spring 109. In this position, finger 103 is substantially centrally located within channel 92. Trigger 115 is integral with elongated body 101 and extends outwardly from the head end of the seat. These components comprise a latch mechanism.

Figures 7, 13:
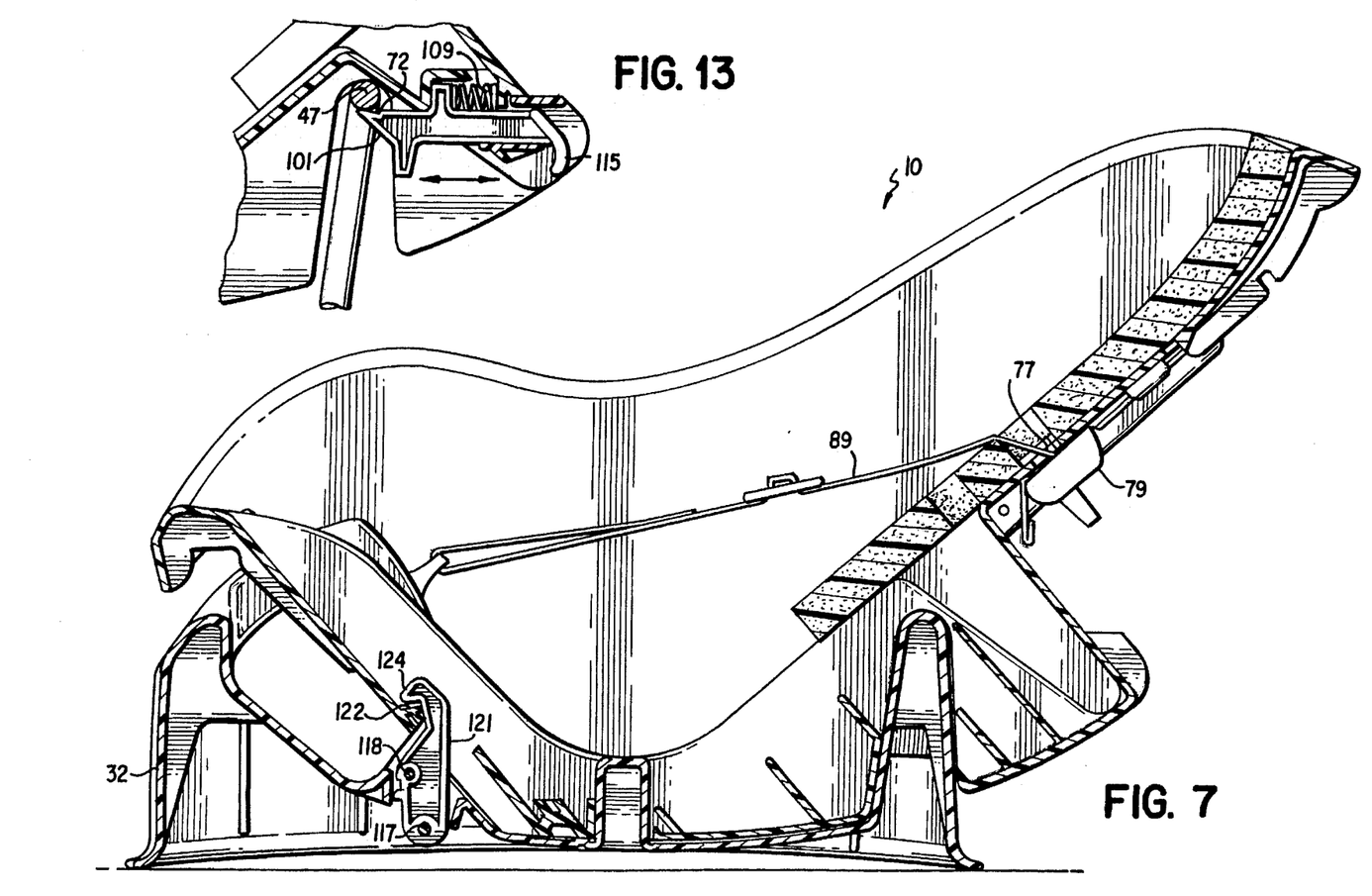
FIG. 7 is a sectional view taken through the lines 7—7 of FIG. 1.
FIG. 13 is a partial sectional view showing the seat in a shopping cart.
Figure 9:
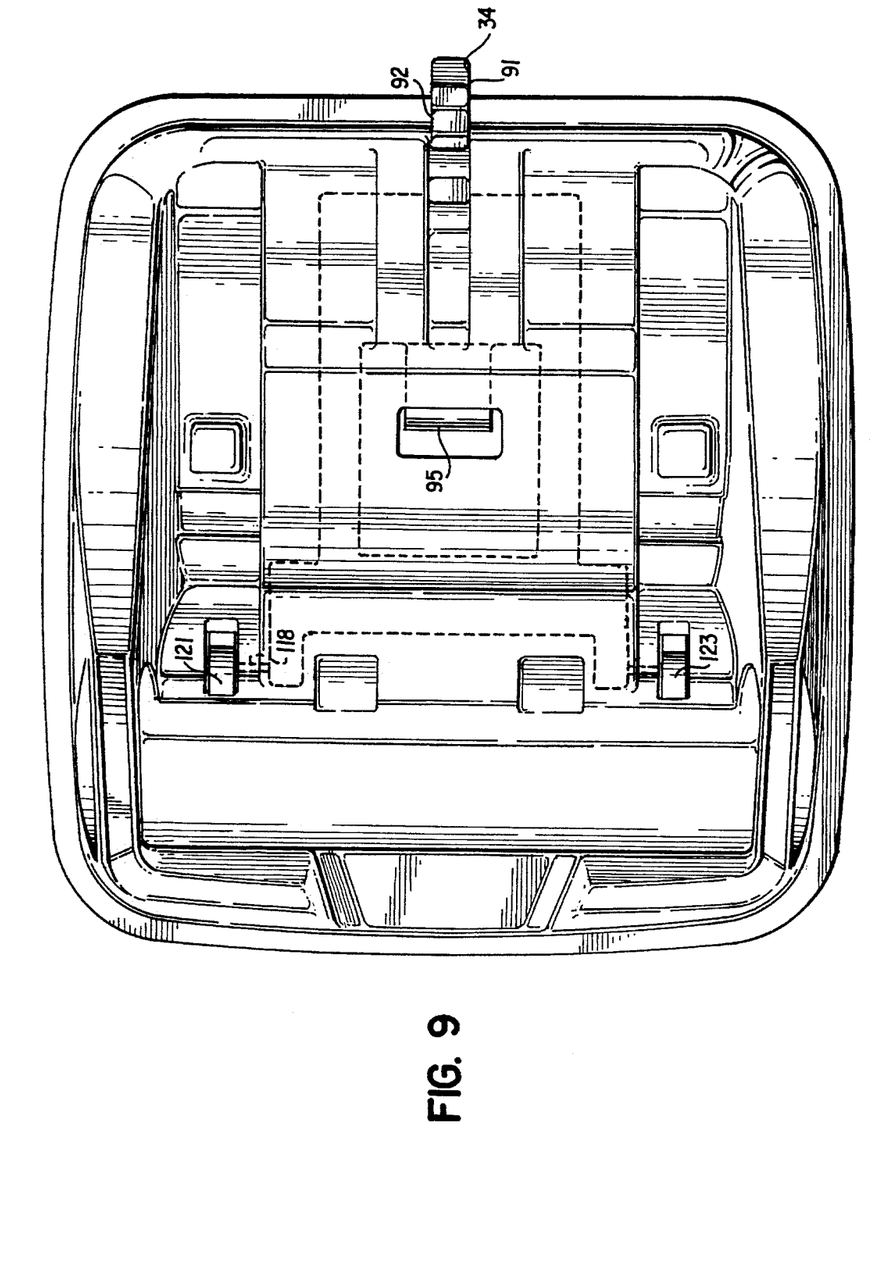
FIG. 9 is a top view of the base with the seat removed.

Turning now to FIGS. 7 and 8, there are shown hooks 121 and 123 pivoted to base 30 on rod 117. Both hooks operate the same and the following discussion will be directed to only one. When seat 10 is in place hook 121 is substantially vertical and upper end 124 extends over lip 122 extending from the underside of the seat. Hook 121 is connected to frame 90 by means of rod 118, as shown in FIG. 9. As can be seen in FIG. 8, retaining rod 119 is held in place by a circular plate and screw means, and rod 117 is held in place by similar means attached to retaining blocks 125 and 127.

FIGS. 10-17 illustrate a modification of the latching/locking means of the seat/base shown in FIG. 1. Elements common to both modifications retain their original numerical references.

Figure 10:
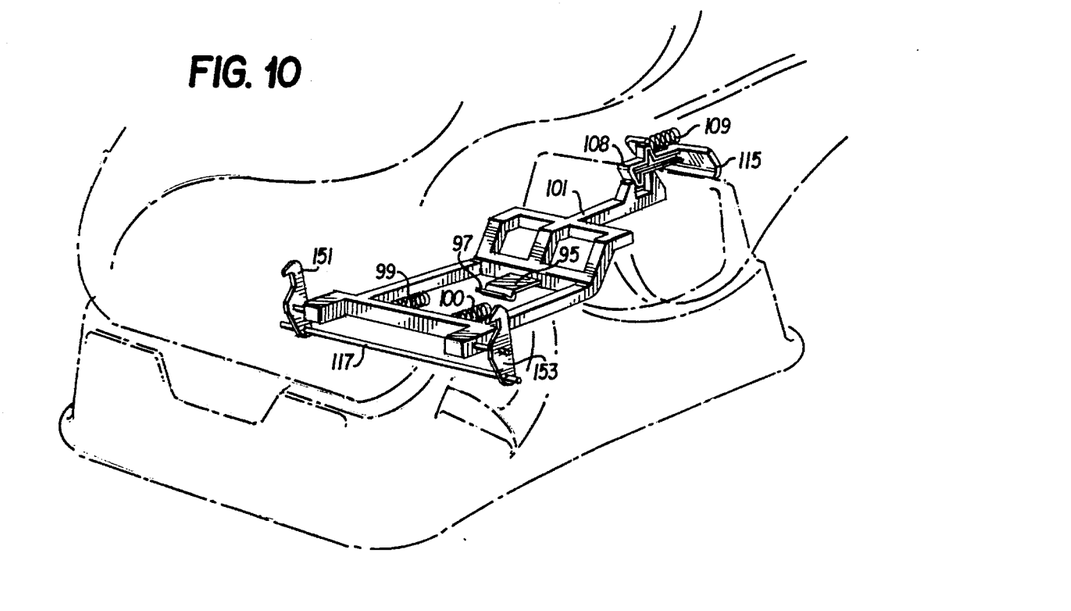
FIG. 10 is a schematic showing a modification of the locking means with the base shown in phantom.
Figures 11, 12:
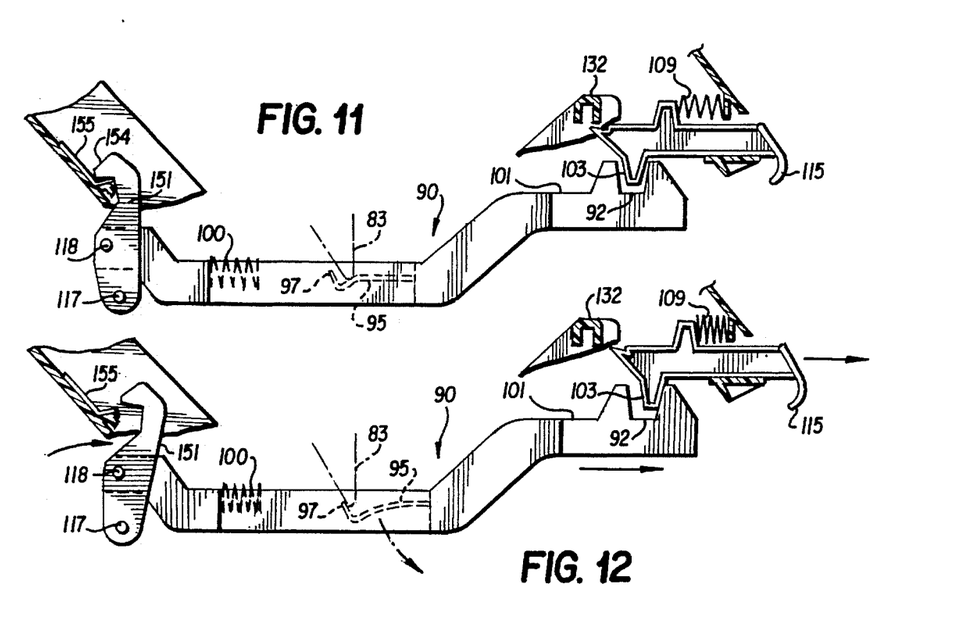
FIG. 11 is a schematic showing the locking means of FIG. 10 wherein the seat is locked to the base.
FIG. 12 is a schematic showing the locking means in the release position allowing removal of the seat from the base.

Operation of the latching/locking mechanism can be more clearly understood from FIGS. 10, 11, and 12. FIG. 10 is a schematic of frame 90 and associated hooks 151, 153 and elongated member 101 with the remaining structure shown in phantom. Since hooks 151 and 153 operate in identical fashion, the following description will refer only to one of the hooks. FIG. 11 shows the mechanism in its locked position when the seat is resting on the base. In this modification, hooks 151 and 153 are preferably made of a hard-wear resistant material such as steel. In order to ensure long wear, L-shaped steel plate 155 is secured to under surface 122 of the seat adjacent the opening through which the latch passes. When seat 10 is placed on the base, the shorter leg of L-shaped plate 155 bears against camming surface 154 of hook 151 so as to force hook 151 to rotate about pivot 117 against the bias of spring 100. After it passes the end of cammed surface 154, hook 151 will snap back into the position shown at FIG. 11. In this position elongated member 101 is in the position as shown and held in that position by bias of spring 109. As shown in phantom, downwardly extending flange 83 is resting within arcuate end 97 of semi-rigid finger 95. Inverted U-shaped member 132 is integral with the base and prevents the head end of the seat from rising away from the base.

When the seat is to be removed, trigger 115 is grasped by a finger and pulled in the direction shown by the arrow, FIG. 12, so as to overcome the bias of spring 109. Depending finger 103 bears against the inner surface of channel 92 of frame 90 and causes the frame to move with the elongated member in the direction again shown by the arrow. Since the frame is connected to hook 151 it will rotate the hook about pivot point 117 by overcoming the bias of spring 100. In order to allow some movement of retaining bar 118, the bar rests within a slot at the end of the frame. As the hook rotates counterclockwise, it is removed from contact with the shorter leg of L-shaped plate 155. At the same time, semi-rigid finger 95 flexes downwardly until it passes downwardly past flange 83. This releases the entire latching system which holds the seat to the base and the seat can then be removed.

FIG. 13 is a partial sectional view taken through the seat showing elongated member 101 in its forward position biased by spring 109. As can be seen, the pointed end of elongated member 101 is designed so as to pass beneath transverse rod 47 of the inner basket. In order to limit movement of the entire basket, shoulder 72 exists in the upper surface of element 101. When the seat is placed on the basket, the angled surface of elongated member 101 acts as a camming surface forcing movement of member 101 to the right against the bias of spring 109. Member 101 snaps back into the position shown once it has cleared rod 47. When the basket is to be removed, trigger 115 is again pulled so as to release the seat from the basket.

Figure 14:
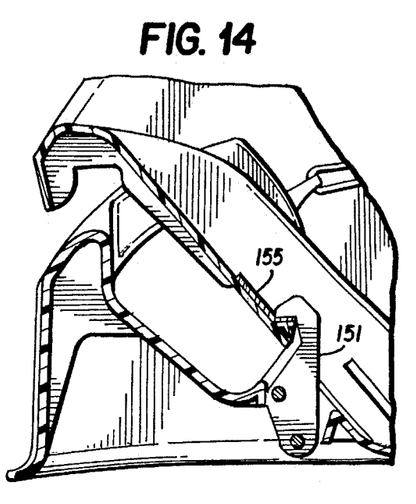
FIG. 14 is an enlarged partial sectional view of the latch means and associated locking means.

FIG. 14 is an enlarged view showing the details of hook 151 and L-shaped plate 155 with the mechanism being in the locked position.

Figure 15:
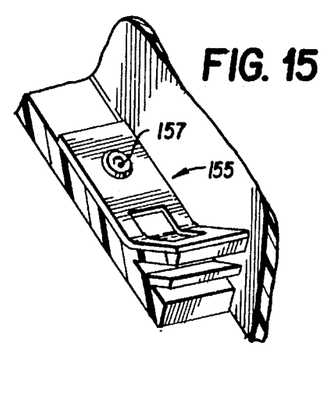
FIG. 15 is a partial perspective view of the locking means of FIG. 10.

FIG. 15 is an enlarged view of L-shaped plate 155 which is mounted on the inner surface of the seat by rivet 157.

Figure 16:
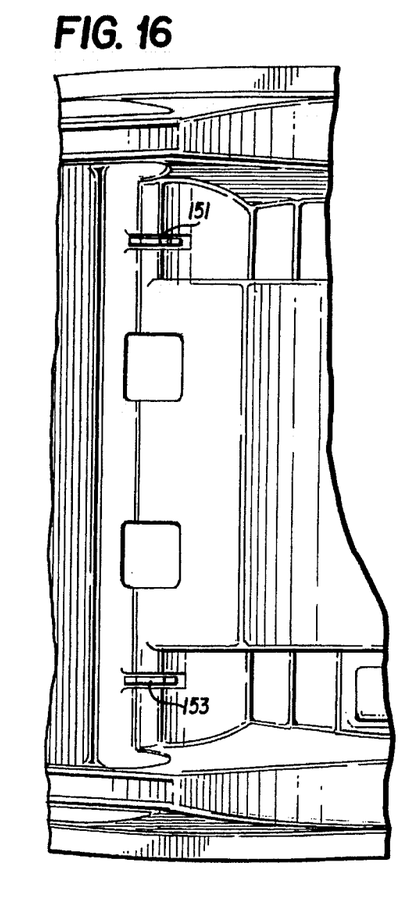
FIG. 16 is a partial top view of the base of FIG. 10.

FIG. 16 is a partial top view of the base showing hooks 151 and 153 protruding upwardly therethrough.

Figure 17:
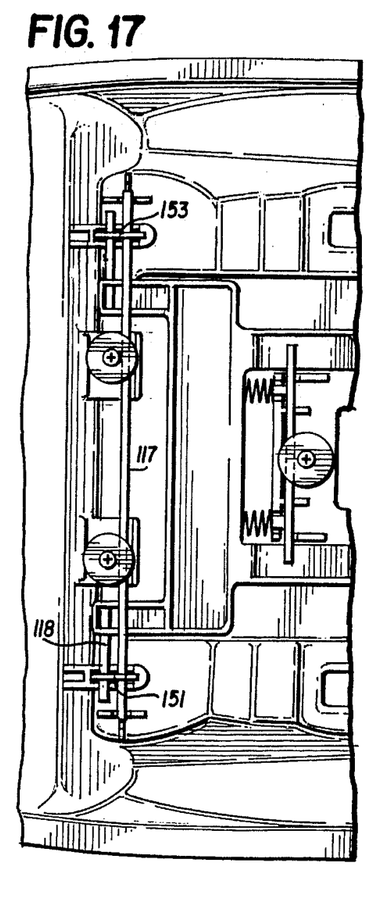
FIG. 17 is a partial bottom view of the base of FIG. 10.

FIG. 17 is a partial bottom view of the base showing the relationship between hooks 151 and 153, pivot rod 117, and connecting rods 118.

The above description and drawings are illustrative only since equivalent components could be used to accomplish the same function. Accordingly, the invention is to be limited only by the scope of the following claims.

I claim:

1. A child carrier comprising seat means having a seat base including a foot end, head end, a back, and side walls;

a spring-biased latch extending through said back of said seat means;

a base geometrically configured so as to mate with the bottom of said seat means, said base having a bottom surface, a head end, foot end, and side walls;

a frame movably mounted within said base and being configured at one end so as to mate with and move with said spring-biased latch;

a pair of steel hooks pivotally mounted within said base, said hooks being of a substantially wear-resistant material;

means for securing the other end of said frame to said hooks;

a second spring for biasing said frame in a direction so as to maintain said hooks in a substantially upwardly extending position;

a pair of orifices in the bottom of said seat means configured so as to mate with said hooks when said seat means is placed on said base;

an L-shaped steel plate secured adjacent each of said orifices for mating with said hooks, said L-shaped plates being of a substantially wear-resistant material;

whereby movement of said spring biased latch in one direction moves said frame so as to overcome the bias of said second spring and rotate said hooks to a position of non-engagement with said L-shaped plates so as to permit removal of said seat means from said base.

2. The child carrier of claim 1 wherein each of said hooks has a camming surface which bears against said L-shaped plates when said hooks are inserted into said orifices.

* * * * *